United States Patent [19]

Coffin

[11] Patent Number: 5,365,665
[45] Date of Patent: Nov. 22, 1994

[54] RAZOR HEAD WITH FLOW PASSAGES

[75] Inventor: Dave Coffin, Norfolk, Great Britain

[73] Assignee: Warner-Lambert Company, Morris Plains, N.J.

[21] Appl. No.: 27,084

[22] Filed: Mar. 5, 1993

[30] Foreign Application Priority Data

Mar. 6, 1992 [GB] United Kingdom ............ 9204855.2

[51] Int. Cl.⁵ .................. B26B 21/00; B26B 21/14; B26B 21/16
[52] U.S. Cl. .......................... 30/50; 30/32; 30/64
[58] Field of Search ............... 30/50, 52, 53, 54, 60, 30/64, 71, 32

[56] References Cited

U.S. PATENT DOCUMENTS

| | | | |
|---|---|---|---|
| 3,816,916 | 6/1974 | Kuhnl | 30/50 |
| 3,890,704 | 6/1975 | Ferraro. | |
| 3,935,639 | 2/1976 | Terr et al. | 30/50 |
| 4,641,429 | 2/1987 | Abatemarco. | |
| 4,852,254 | 8/1989 | Duncan | 30/50 |
| 4,970,784 | 11/1990 | Althaus et al. | 30/50 |
| 5,060,377 | 10/1991 | Althaus et al. | 30/50 |
| 5,185,927 | 2/1993 | Rivers | 30/50 |

FOREIGN PATENT DOCUMENTS

| | | |
|---|---|---|
| 0178066 | 4/1986 | European Pat. Off. . |
| 2066132 | 7/1981 | United Kingdom . |
| 2108033 | 5/1983 | United Kingdom . |

*Primary Examiner*—Richard K. Seidel
*Assistant Examiner*—Paul M. Heyrana, Sr.
*Attorney, Agent, or Firm*—Robert W. Becker & Associates

[57] ABSTRACT

The razor head has a plastic housing with a front guard-bar, a rear wall, and a blade platform for supporting at least one razor blade. At least two spacers are affixed to the razor blades and are spaced apart to form openings between them. Perforations that are aligned with these openings are provided in the rear wall and/or the blade platform.

11 Claims, 4 Drawing Sheets

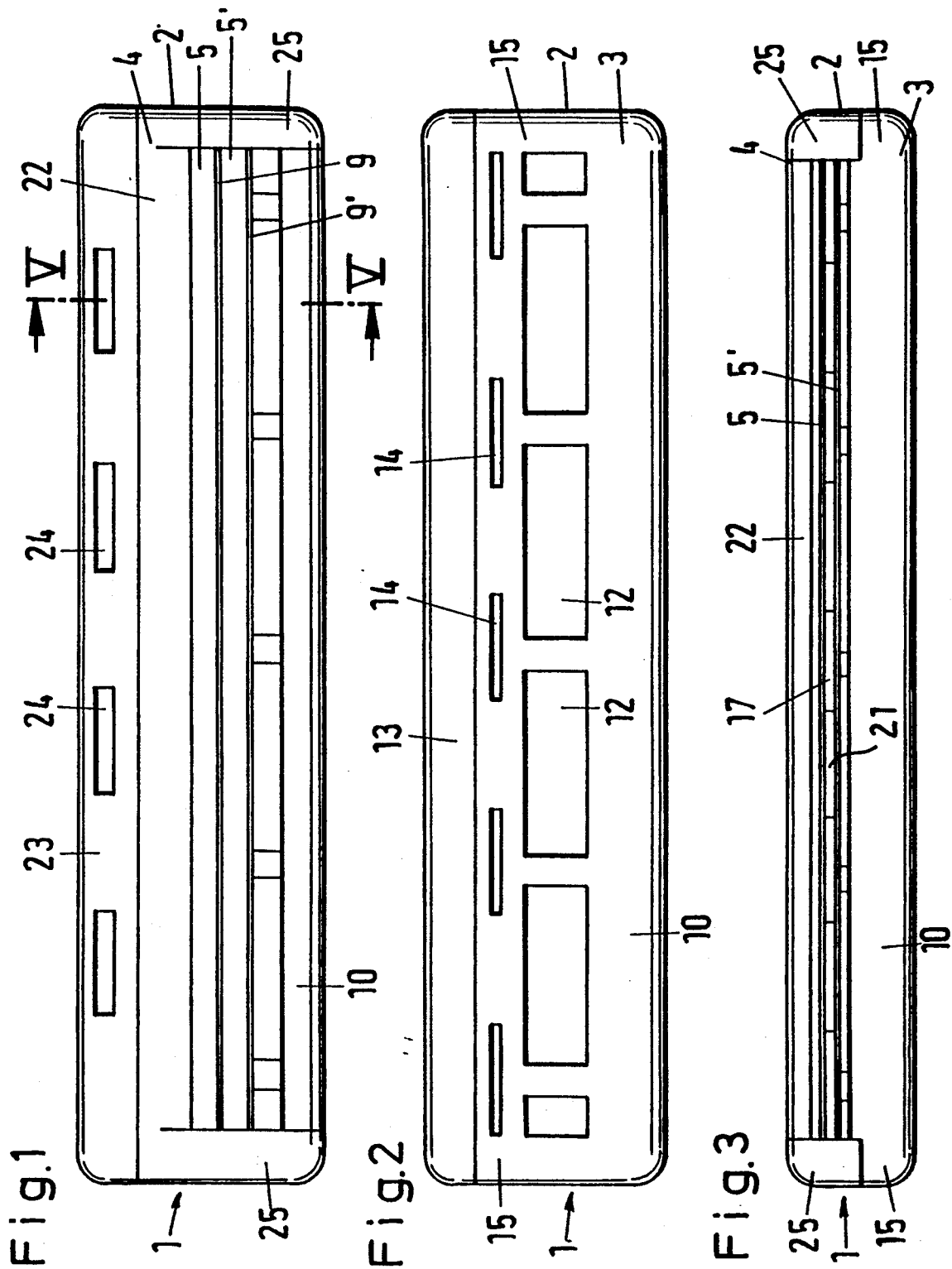

RAZOR HEAD WITH FLOW PASSAGES

BACKGROUND OF THE INVENTION

The present invention relates to a razor head for a wet razor. The razor head is arranged at the front end of a handle and has a single or double razor blade arranged in a plastic housing having perforations and a front guardbar.

In conventional wet razors, a single or double razor blade is permanently embedded in a plastic housing in the razor head. If the razor head is constructed separately from the handle and is fastened to a handle by interlocking elements, the razor head is known as a razor blade unit.

Razor heads commonly have perforations in the plastic housing to allow shaving foam to flow through the plastic housing and to prevent the shaving foam from collecting inside the plastic housing. These perforations also help in efforts to clean the razor head after shaving has been completed.

However, perforations in known razor heads do not operate with complete satisfaction because they do not allow an optimum flow of shaving foam through the razor head during shaving. This has been found to be a particular problem with known razor heads which are razor blade units that are detachable from the razor handle.

Moreover, it is impossible to thoroughly clean known razor heads after shaving. Despite the presence of perforations in conventional plastic housings, soap residue remains trapped within the housing, because shaving foam is not completely rinsed out through the perforations.

It is therefore an object of the present invention to improve the arrangement of the perforations in a razor head, in particular in a razor blade unit of a wet razor.

A further object of the invention is to provide a razor head in which the blades are accurately located.

Further objectives will be apparent from the following description and claims.

SUMMARY OF THE INVENTION

To realize these objects, the invention provides a plastic housing having perforations both on the underside and at the rear, with these perforations communicating with an open region of the plastic housing at the cutting edges of the razor blades.

This arrangement provides a razor head with an optimum arrangements of perforations. These perforations proceed from the region of the cutting edges of the razor blades and are continuous through the razor head. Such an arrangement guarantees optimum flow of shaving foam through the razor head and optimizes cleaning efforts by preventing soap residue from gathering inside the plastic housing.

The perforations on the underside of the housing are preferably formed by intermediate spaces between webs which connect a guardbar to the remainder of the plastic housing. In this way, it is possible to create a flow area with an optimum cross-section in the region of the underside perforations.

The guardbar preferably is bevelled backwards along its rear side, starting from its top side. This bevel defines a flow channel running obliquely backwards and downwards.

To prevent shaving foam and soap residue from piling up and collecting in inaccessible crevices, the webs preferably have recesses on a top side in a region behind the guardbar.

In the preferred embodiment, the invention provides a blade block formed from two blades separated by a number of spacers affixed along the length of the blades. Sufficient space is left between the spacers to allow for the passage of shaving debris.

Openings between the spacers are aligned with the perforations in the bottom part at the rear of the plastic housing. In this way, perforations at the rear are created in a simple fashion. Consequently, during shaving, the shaving foam can travel through the gaps between the two razor blades, thus improving the overall shaving properties of the razor.

In such an arrangement, the openings defined by mutually neighboring holes provide an optimum flow cross-section. The webs which connect the front guardbar to the remainder of the plastic housing are located in line with the spacers. This has the advantage of minimizing the resistance to flow caused by the spacers and by the webs.

The spacers are fixed to the blades and have projections at each end which accurately locate the blades with respect to the plastic housing.

To further improve the shaving properties, the razor head is provided with a friction-reducing slide strip. The slide strip is arranged parallel to the cutting edges of the razor blades and formed of water-soluble or water-insoluble polymers.

It is to be understood that both this general description and the following detailed description are exemplary and explanatory only and are not restrictive of the invention as claimed.

BRIEF DESCRIPTION OF THE DRAWINGS

A razor head according to the invention will now be described in greater detail, by way of example only, with reference to the accompanying drawings, in which:

FIG. 1 is a top view of the razor blade unit;

FIG. 2 is a bottom view of the razor blade unit;

FIG. 3 is a front view of the razor blade unit;

DESCRIPTION OF PREFERRED EMBODIMENTS

Figure 4:
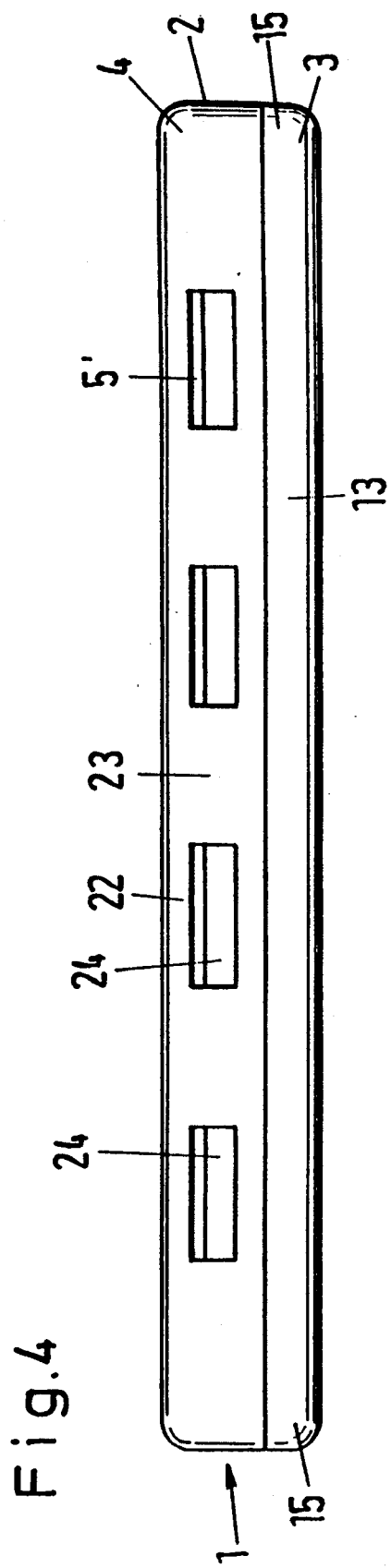
FIG. 4 is a rear view of the razor blade unit.
Figure 5:
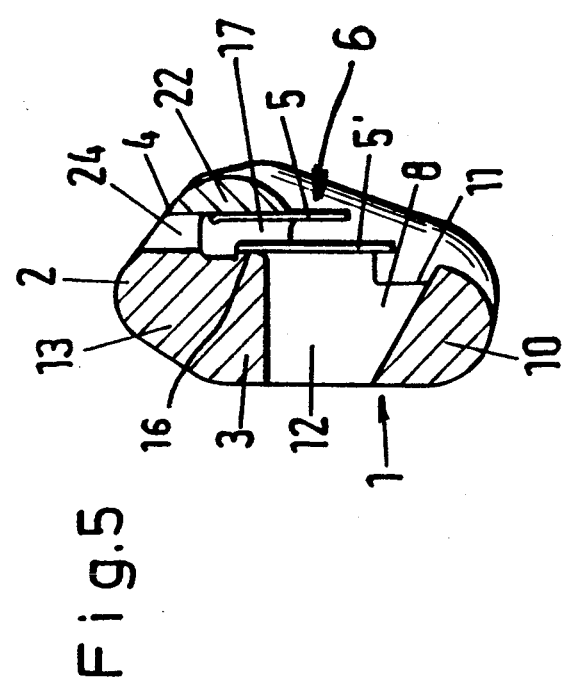
FIG. 5 is a partial cutaway taken along the line V—V of FIG. 1.

The razor blade unit 1 includes a plastic housing 2. The plastic housing 2 includes a bottom part 3 and an upper alignment strip 4, which are permanently connected to one another and which locate firmly between themselves a blade block 6 that carries the razor blades 5, 5'. The alignment strip 4 and the bottom part 3 may be connected together by methods such as bonding or ultrasonic welding, or by using frictionally engaged pins and bores.

The bottom part 3 of the plastic housing 2 has spaced integral support webs 8 that extend perpendicular to the longitudinal extent of the cutting edges 9, 9' of the two razor blades 5, 5'. These support webs 8 carry at the front free end a guardbar 10, the front surface of which is rounded off. In this arrangement, the support webs 8 include recesses 11 formed in the region behind the guardbar 10.

Perforations 12 are defined in the regions between mutually neighboring support webs 8 and the guardbar 10 as seen, in particular, in the bottom view in FIG. 2.

A rear wall 13 extends parallel to the guardbar 10. The wall 13 is bevelled downwards towards the center of the housing 2. In this arrangement, recesses are located at the base of the rear wall 13. The recesses are in the form of longitudinal slots 14 which serve to receive the blade block 6. The bottom part 3 of the plastic housing 2 further includes side walls 15.

Figure 6:
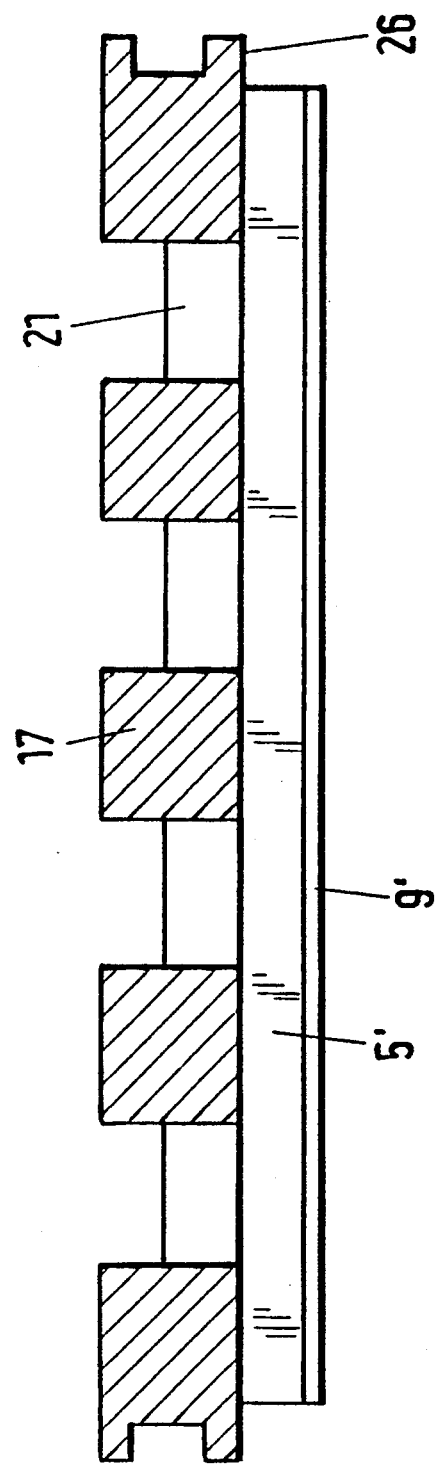
FIG. 6 is a longitudinal section through the spacers of the blade block.
Figure 7:
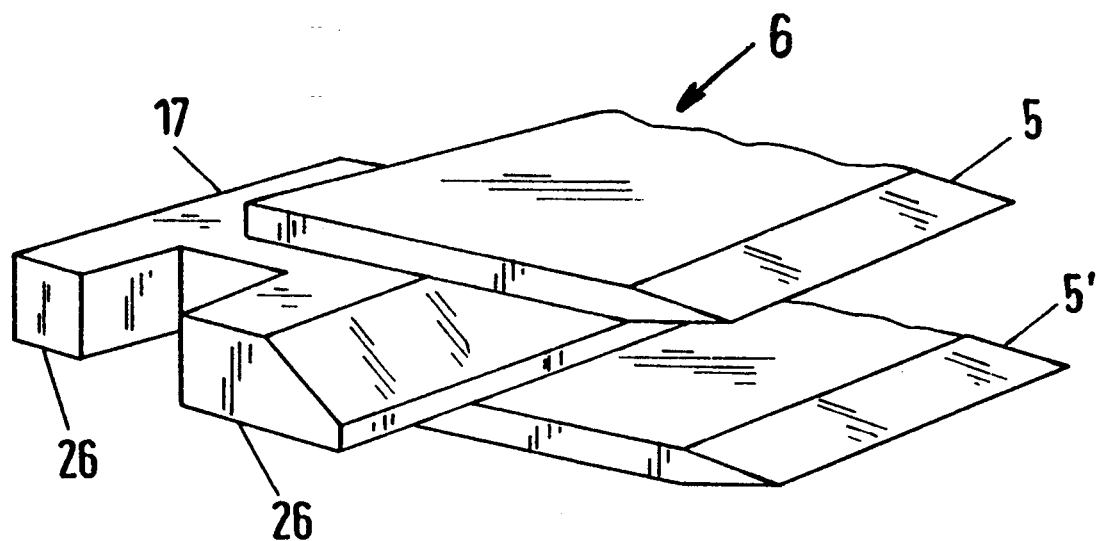
FIG. 7 is an end projection of the blade block.
Figure 8:
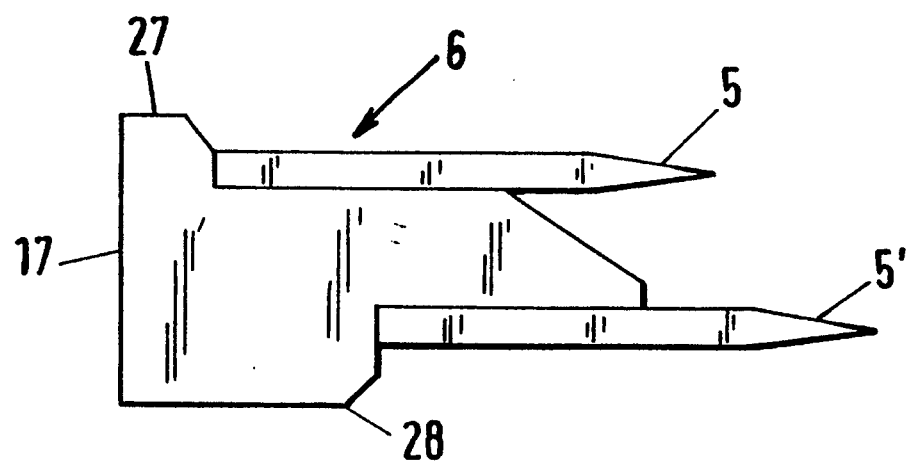
FIG. 8 is a transverse cross-section through the blade block.

The support webs 8 of the bottom part 3 of the plastic housing 2 form a blade platform 16 for supporting the blade block 6. As shown in FIGS. 3 and 6 the blade block 6 comprises a number of separate spacers 17, each of which has two flat sides which serve to receive and fasten the two razor blades 5, 5'. The two razor blades 5, 5' are aligned parallel to one another, while the cutting edges 9, 9'are offset with respect to one another. Openings 21 are left free between the spacers 17, which can be made of plastic or metal, such as aluminum.

To assemble the blade block 6 the individual spacers 17 are located in the required positions on the bottom blade and are affixed either by glue or by welding. The top blade is then located and fixed on the top of the spacers. In a preferred embodiment the spacers 17 are provided with protrusions or ridges 27, 28 extending at the rear side and abutting against the rear edge of the upper and lower blades respectively. To assemble the razor blade unit, the blade block 6 is set from above onto the bottom part 3 in such a way that the underside of the lower razor blade 5' rests on the blade platform 16 defined by the support webs 8. Furthermore, the free ends of the spacers 17 may comprise downwardly protruding extensions which are received in the longitudinal slots 14 of the bottom part 3. The blade block 6 is thus fixed on the bottom part 3 of the plastic housing 2. The end spacers are provided with extensions or protrusions 26 that locate in corresponding recesses in the side walls 25 of the alignment strip 4. This location serves to accurately position the blades and therefore the cutting edges 9, 9' with respect to the skin-contacting surfaces of the alignment strip 4 and the plastic housing 2. The precise protrusion of the cutting edges beyond the skin contacting surfaces is essential to the proper functioning and safety of the razor head.

The alignment strip 4 defines a cover cap 22 that rests on the top side of the upper razor blade 5. The rear wall 23 is integrally formed with the cover cap 22. The wall 23 has perforations 24, which are aligned with the openings 21 formed by the spacers 17 and the blades. The alignment strip 4 also has the wings or side walls 25 (FIG. 1) integrally formed on both sides.

To form the complete razor blade unit 1, the alignment strip 4 is fitted onto the bottom part 3 from above. In this process, the rear wall 23 of the alignment strip 4 lies flat on the rear wall 13 of the bottom part 3, and the underside of the wings 25 lie flat on the side walls 15 of the bottom part 3. The alignment strip 4 and the bottom part 3 can then be permanently connected by bonding, ultrasonic welding, or by being frictionally engaging parts.

The cover cap 22 defined by the alignment strip 4 can, in addition, furthermore be provided with a friction-reducing coating.

The individual spacers 17 with the openings 21, which define flow-through channels, permits the production of a narrow blade. The combination of the perforations 24 in the alignment strip 4, the openings 21 and the perforations 12 in the bottom part 3, guarantee a better flow through the housing and an improved and simpler cleaning operation.

The present invention is, of course, in no way restricted to the specific disclosure of the specification and drawings, but also encompasses any modifications within the scope of the appended claims.

What I claim is:

1. A razor head for a wet razor, said razor head having at least one razor blade with a cutting edge and comprising:

a plastic housing having a front guardbar, a rear wall, and a blade platform for supporting said at least one razor blade; and at least two individual spacers, said individual spacers being affixed to said at least one razor blade and being spaced apart to form openings between them, with perforations being provided in at least one of said rear wall and said blade platform, with said perforations being aligned with said openings between said individual spacers.

2. A razor head according to claim 1, wherein at least one of said spacers is provided with an upwardly extending protrusion that abuts against a rear edge of said at least one razor blade.

3. A razor head according to claim 1, wherein at least one of said spacers is provided with a downwardly extending protrusion that abuts against a rear edge of said at least one razor blade.

4. A razor head according to claim 1, wherein said spacers protrude beyond a back edge of a rearmost one of said razor blades and engage respective recesses in said rear wall of said housing.

5. A razor head according to claim 1, wherein a respective one of said spacers is disposed at each of two ends of said at least one razor blade.

6. A razor head according to claim 5, wherein at least one of said spacers disposed at said ends of said razor blades is provided with at least one protrusion that extends beyond a side edge of said razor blades and engages recess means provided in side walls of said housing.

7. A razor head according to claim 1, wherein said spacers are made of metal.

8. A razor head according to claim 7, wherein said metal is aluminum.

9. A razor head according to claim 1, wherein said spacers are made of plastic.

10. A razor head according to claim 1, wherein said spacers are affixed to said at least one razor blade by means of welding.

11. A razor head according to claim 1, wherein said spacers are affixed to said at least one razor blade by means of gluing.

* * * * *